United States Patent [19]

Rohr

[11] Patent Number: 4,673,544

[45] Date of Patent: Jun. 16, 1987

[54] PUSHING DEVICE FOR SLIDING FUEL RODS OUT OF A NUCLEAR REACTOR FUEL ASSEMBLY

[75] Inventor: Franz Rohr, Erlangen, Fed. Rep. of Germany

[73] Assignee: Siemens Aktiengesellschaft, Munich, Fed. Rep. of Germany

[21] Appl. No.: 580,693

[22] Filed: Feb. 16, 1984

[30] Foreign Application Priority Data

Sep. 2, 1983 [DE] Fed. Rep. of Germany ....... 3331761

[51] Int. Cl.[4] .............. G21C 19/10; G21C 19/12; B65G 25/08
[52] U.S. Cl. .................... 376/261; 376/268; 376/271; 29/723; 198/719
[58] Field of Search .......... 376/260, 261, 268, 271; 29/723; 414/17, 146, 746; 198/719

[56] References Cited

U.S. PATENT DOCUMENTS

| | | | |
|---|---|---|---|
| 3,140,238 | 7/1964 | Fraas et al. | 376/271 |
| 3,501,826 | 3/1970 | Marcus | 29/713 |
| 3,510,012 | 5/1970 | Meteren | 414/746 |
| 4,358,421 | 11/1982 | Jabsen | 376/271 |
| 4,551,299 | 11/1985 | Shields | 376/261 |

FOREIGN PATENT DOCUMENTS

| | | |
|---|---|---|
| 0066695 | 12/1982 | European Pat. Off. |
| 2054394 | 4/1972 | Fed. Rep. of Germany |
| 2623103 | 12/1977 | Fed. Rep. of Germany ...... 376/271 |
| 2158112 | 6/1973 | France ................. 376/271 |
| 844168 | 8/1960 | United Kingdom ................ 376/271 |
| 325635 | 1/1972 | U.S.S.R. ............... 376/271 |

OTHER PUBLICATIONS

V. Gerard et al., "ADAC-Operation of a Fuel-Dismantling Line in a Cell Mockup", 12th Conf. Remote Systems Tech., ANS, Nov. 1964, pp. 159-165.

Primary Examiner—John F. Terapane
Assistant Examiner—Eric Jorgensen
Attorney, Agent, or Firm—Kenyon & Kenyon

[57] ABSTRACT

A pushing device for removing spent fuel rods from a nuclear reactor fuel assembly comprises a plurality of axially shiftable rods disposed in the same geometric pattern and with the same pitch as the fuel rods. The push rods are mounted at their upper ends to a pressure strip or plate and traverse at their lower ends bores in a guide plate fixed via guide rods to a base plate located on the other side of the pressure plate, the pressure plate being movably secured to the guide rods for linear motion between the base plate and the guide plate. A drive mounted to the base plate is connected to the pressure plate for shifting the latter, while a safety mechanism is provided for interrupting the motion of a push rod if the respective fuel rod is jammed in the fuel assembly.

19 Claims, 12 Drawing Figures

PUSHING DEVICE FOR SLIDING FUEL RODS OUT OF A NUCLEAR REACTOR FUEL ASSEMBLY

BACKGROUND OF THE INVENTION

This invention relates to a pushing device for sliding fuel rods out of a nuclear reactor fuel assembly.

European Patent Application No. 83 10 7568.4 discloses a so-called dense-packing device which serves to compress, into a packing as dense as possible and preferably into a hexagonal array, fuel rods removed form a reactor fuel assembly and to transfer them into a storage container. To this end it is necessary to slide the fuel rods out of the spacers of the reactor fuel assembly by means of a pushing device and to introduce them into the dense-packing device via guide means, for instance, a guide tube bundle.

After the fuel rods are subjected to a relatively high thermal stress during their operating phase and are also exposed to chemical influences, it may happen that individual fuel rods get jammed in the spacers. In such a case, the pushing device should be switched off altogether above a given pressure in order to avoid major damage. At least the force applied to the jammed fuel rods should be interrupted.

An object of the present invention to provide a pushing device of the above-described type capable of sliding a desired number of fuel rods, in particular, all fuel rods simultaneously, out of the fuel assembly mounting and to introduce them into guidance means for the purpose of placing them in a dense-packing device.

Another object of the present invention is to provide such pushing device in which the force applied to a fuel rod is interrupted or reduced upon a jamming of the fuel rod in its spacer mounting.

Another, more particular, object of the present invention is to provide such a pushing device in which, upon a jamming of one or a small number of fuel rods, many or all of the remaining rods can still be removed.

SUMMARY OF THE INVENTION

In a nuclear reactor installation having a fuel assembly with spacers holding a multiplicity of nuclear fuel rods disposed parallel to one another in a geometric array, a pushing device in accordance with the present invention for simultaneously sliding from the spacers a plurality of fuel rods disposed in a geometric pattern comprises a plurality of axially movable push rods, a first mounting assembly, a second mounting assembly, a third mounting assembly, a drive and a locking assembly. The push rods are equal in number to the fuel rods to be simultaneously removed from the spacers and are disposed parallel to each other in the pattern in which the plurality of fuel rods is arranged. The first mounting assembly includes a pressure plate secured to the push rods at one end thereof for supporting the push rods and further includes a guide plate disposed at an opposite end of the push rods in a disengaged state of the pushing device for guiding the push rod during operation of the pushing device. The guide plate has a plurality of bores at least equal in number to the push rods and having substantially the same cross-sectional area and shape as the push rods. The bores in the guide plate are disposed in the same pattern as the push rods and are traversed thereby. The second mounting assembly includes a base plate on a side of the pressure plate opposite the guide plate and guide rods secured to the base plate and the guide plate for slidably securing the pressure plate for motion in a direction parallel to the push rods. The third mounting assembly is connected to the base plate and to the guide plate for supporting the same in a operating position juxtaposed to the fuel assembly. The drive is operatively connected to the base plate and to the pressure plate for moving the pressure plate relative to the base plate, thereby sliding the plurality of fuel rods from the spacers by means of the push rods. The locking assembly is connected to the push rods for preventing motion of at least any one push rod upon the exceeding of a threshold pressure by the force transmitted by that one push rod.

In accordance with another feature of the present invention, the first mounting assembly includes a mounting plate slidably attached to the guide rods between the pressure plate and the guide plate, the mounting plate having a plurality of bores at least equal in number to the push rods and having substantially the same cross-sectional area and shape as the push rods. The bores in the mounting plate are disposed in substantially the same pattern as the push rods and are traversed thereby.

In accordance with another feature of the present invention, the drive takes one of at least two alternative forms. The drive may include at least one threaded spindle traversing the base plate and threadedly engaging a threaded nut supported on the base plate. The spindle is secured to the pressure plate and a rotary power source is operatively connected to the threaded nut, whereby rotary power produced at the output of the power source is transformed into linear motion of the pressure plate.

In an alternative form the drive includes a spindle rotatably mounted to the base plate and to the guide plate and extending substantially parallel to the push rods. The pressure plate is provided with a threaded bore traversed by the spindle, the spindle having an external thread operatively engaging the threaded bore of the pressure plate. Rotary motion of the spindle is thus converted into linear motion of the pressure plate and of the push rods connected thereto.

Pursuant to a particular feature of the present invention, the locking assembly assumes one of at least two different embodiments. In the first embodiment a switch is operatively connected to the drive for disengaging the drive upon the exceeding of the threshold pressure by the force transmitted by a stalled push rod. The first mounting assembly includes at least one spring engaging the pressure plate and the push rods in part for transmitting compressive force from the pressure plate to the push rods and in part for determining the threshold pressure.

In the other embodiment of the locking assembly, at least one shear pin is rigidly connected to the pressure plate and to the push rods and forms a component of the first mounting assembly as well as of the locking assembly. Upon the exceeding of the threshold pressure determined by the size, shape and material of the shear pin, the shear pin breaks, thereby preventing continued motion of the push rods. Preferably, each push rod is provided with its own shear pin rigidly connected to the pressure plate.

A pushing device in accordance with the present invention is advantageous in that it allows removal of all or substantially all fuel rods from a nuclear reactor fuel assembly simultaneously. In the event that one or more fuel rods become jammed or caught in their respective spacers, the locking assembly in accordance with the present invention interrupts the continued application of force to these jammed fuel rods, thereby preventing damage to the reactor fuel assembly. If the shear pin type locking assembly is being used or if a plurality of pressure plates is included in a pushing device utilizing a locking assembly of the interrupter switch type, the pushing device may still be operative upon the jamming of a single fuel rod to remove some, or even all, of the other fuel rods of the fuel assembly.

In accordance with a particular feature of the present invention, one or more mounting plates may be provided between the pressure plate and the base plate for supporting the push rods against bending during operation of the pushing device.

DETAILED DESCRIPTION OF THE INVENTION

Figure 1:
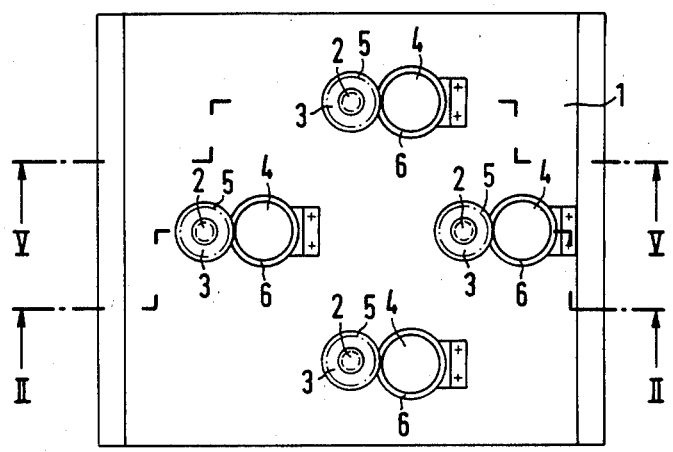
FIG. 1 is a partially schematic top view of a pushing device according to the present invention.

As illustrated in FIGS. 1 through 4, a pushing device for sliding a plurality of fuel rods (and, in particular all the fuel rods) from their respective spacers in a nuclear reactor fuel assembly comprises, according to the present invention, a plurality of pressure plates 11, 12, 13 and 14 slidably mounted via ball bearing sleeves 15 to respective pairs of guide rods 16 rigidly secured at their upper ends to a base plate 1 and at their lower ends to a guide plate 17. To each pressure plate 11, 12, 13 and 14 is mounted a respective plurality of push rods 18 disposed parallel to one another in a geometric pattern corresponding to the geometric pitch between the rods of a respective plurality of fuel rods in a nuclear reactor fuel assembly. Each push rod 18 is provided at an upper end with a pair of spaced beads or ribs 19 and 20, bead 19 engaging an upper surface of the respective pressure plate 11, 12, 13 and 14 and bead 20 being spaced from the lower surface of the same pressure plate. Between the bead 20 and the respective pressure plate 11, 12, 13 or 14 each push rod 18 is provided with a respective compression spring 21. During operation of the pushing device shown in FIGS. 1 through 4, the pressure plates 11, 12, 13 and 14 slide downwardly along the respective pairs of guide rods 16 and exert pressure on springs 21, thereby compressing those springs and transmitting force therethrough to push rods 18.

Each pressure plate 11, 12, 13 and 14 is connected via a respective brace or bracket 7, 8, 9 and 10 to a respective drive spindle 2 traversing base plate 1 and screwably mounted thereto via a respective drive nut 3 with an internal thread. Each drive nut 3 is rotatably supported on base plate 1 and has an external spur gear 5 which meshes with a pinion 6 of an associated electric reduction motor 4. In accordance with the direction of rotation of pinion 6, spindle 2 and the associated pressure plate 11, 12, 13 or 14 executes an upward or downward motion, thereby moving the corresponding push rods 18 into respective spacers of the nuclear reactor fuel assembly and extracting the fuel rods from such spacers.

Each pressure plate 11, 12, 13 and 14 is provided with a respective mounting plate 22, 23, 24 and 25 attached to the pressure plate via a respective pair of hang rods 26. Each hang rod 26 is preferably rigidly connected at its lower end to the respective mounting plate 22, 23, 24 or 25 and is slidably connected at its upper end to the respective pressure plate 11, 12, 13 or 14. Each mounting plate 22, 23, 24 and 25 is formed with bores 81 having substantially the same cross-sectional area and the same shape as respective push rods 18. The bores 81 in each mounting plate 22, 23, 24 and 25 are disposed in the same geometric pattern as the group of push rods 18 associated with the respective mounting plate. Mounting plates 22, 23, 24 and 25 descend with their respective pressure plates 11, 12, 13 and 14 during the first half of a fuel rod removal stroke of push rods 18. Upon engagement with the upper surface of guide plate 17, mounting plates 22, 23, 24 and 25 cease their downward motion. During the second half of a fuel rod removal stroke, pressure plates 11, 12, 13 and 14 continue to move downwardly, sliding along hang rods 26 as well as along guide rods 16.

Resting on top of each pressure plate 11, 12, 13 and 14 and slidably mounted to the respective pair of guide rods 16 is an actuator control plate or strip 27, 28, 29 and 30. Upon the jamming of a fuel rod in the nuclear reactor fuel assembly and the consequent arresting of the motion of the corresponding push rod 18, the upper bead 19 of the push rod disengages itself from the upper surface of the respective pressure plate 11, 12, 13 and 14 and engages the lower surface of the respective actuator control strip 27, 28, 29 and 30. Thus an arrested push rod 18 causes an associated actuator control strip 27, 28, 29 or 30 to remain stationary, while the respective pressure plate 11, 12, 13 and 14 continues its downward motion along guide rod 16. Each pressure plate 11, 12, 13 and 14 is provided with a respective proximity switch or microswitch 32 which is operatively, i.e., electrically, connected to a corresponding electric motor 4 for causing the disengagement thereof upon an actuation of the microswitch 32 by an actuator control plate 27, 28, 29 or 30 whose motion has been stopped owing to a jammed fuel rod. The disengagement of a motor 4 interrupts the descent of the respective pressure plate 11, 12, 13 and 14 and of the push rods 18 mounted thereto. However, the other pressure plates and their respective groups of push rods continue to slide fuel rods out of the nuclear reactor fuel assembly. Upon the removal of these fuel rods, the jammed fuel rod may be extracted via other means, thereby minimizing or eliminating damage to the fuel assembly.

Base plate 1 and guide plate 17 are mounted to respective schematically illustrated transport components 33 and 34 which function to shift the pushing device into and out of its operating position juxtaposed to a nuclear reactor fuel assembly. Microswitches 32 are secured to their respective pressure plates 11, 12, 13 and 14 via mounting brackets 31.

In addition to transmitting force from pressure plates 11, 12, 13 and 14 to push rods 18, compression springs 21 serve to define pressure thresholds or upper stress limits of push rods 18. Upon an exceeding of these pressure thresholds by the internal stresses or forces transmitted by push rods 18, microswitches 32 are actuated and motors 4 for engaged.

Figure 3:
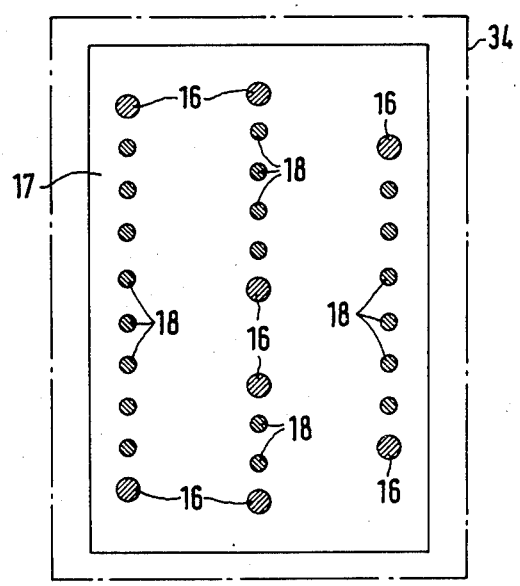
FIG. 3 is a horizontal or transverse cross-section view taken along line III—III in FIG. 2.
Figure 2:
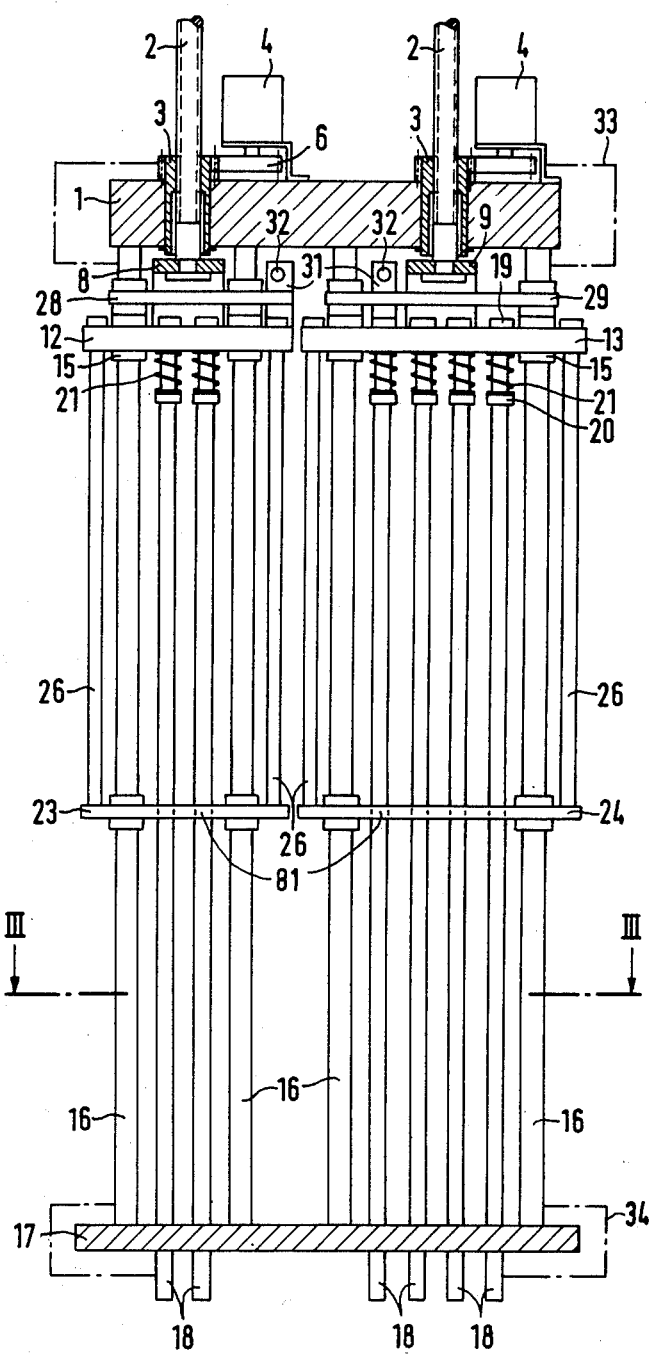
FIG. 2 is a vertical or longitudinal cross-section taken along line II—II in FIG. 1.
Figure 4:
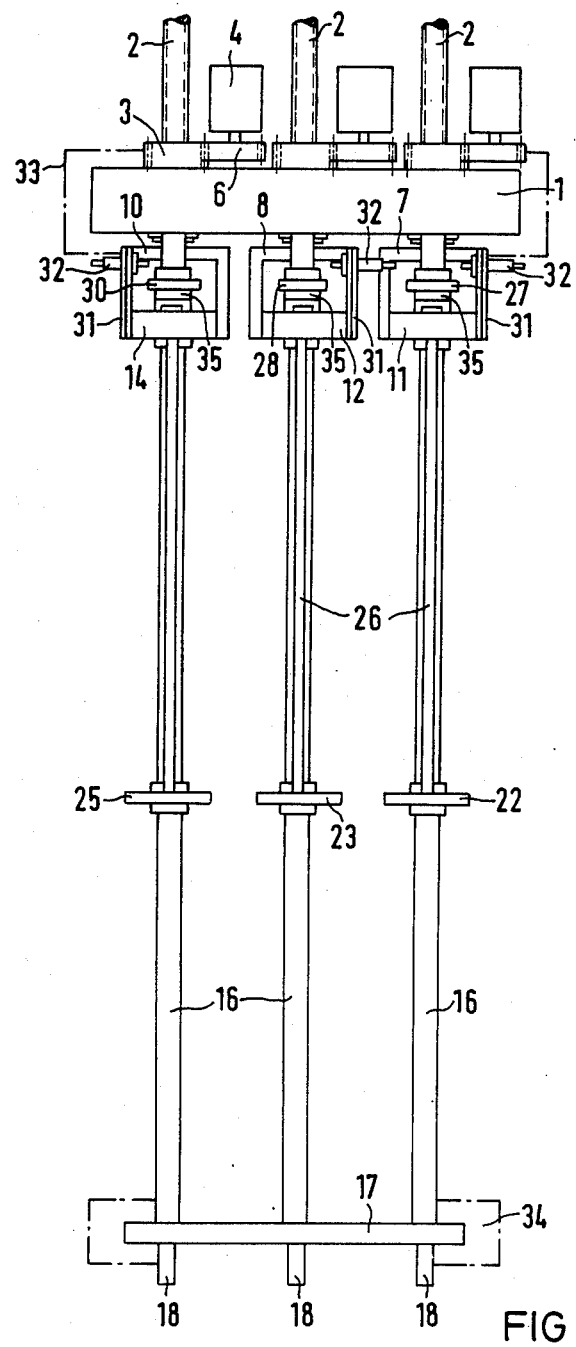
FIG. 4 is a side elevation view of the pushing device of FIGS. 1 through 3.

As illustrated in FIG. 3, the push rods 18 may be arranged in rows at the raster pitch of the fuel assembly, with different numbers of push rods per row. One reason for the geometry shown in FIG. 3 is that gaps must be provided for control rod guide tubes which remain in the fuel assembly. The arrangement of rods shown in FIG. 3 enables the sliding out of varying quantities of rods, depending upon the situation found, e.g., on the number and locations of jammed fuel rods. A coordinate transport system 33 and 34 permits the disposition of a pressure plate 11, 12, 13 or 14 and its associated push rods 18 over different groups of fuel rods, whereby the pushing device according to the present invention is adapted to different conditions of the fuel assembly. The end of push rods 18 facing the fuel assembly are advantageously designed in the shape of a hemisphere or a funnel for at least partially enclosing the plugs of the fuel rods to prevent the push rods from sliding laterally off of the fuel rods under the action of pressure.

Figure 5:
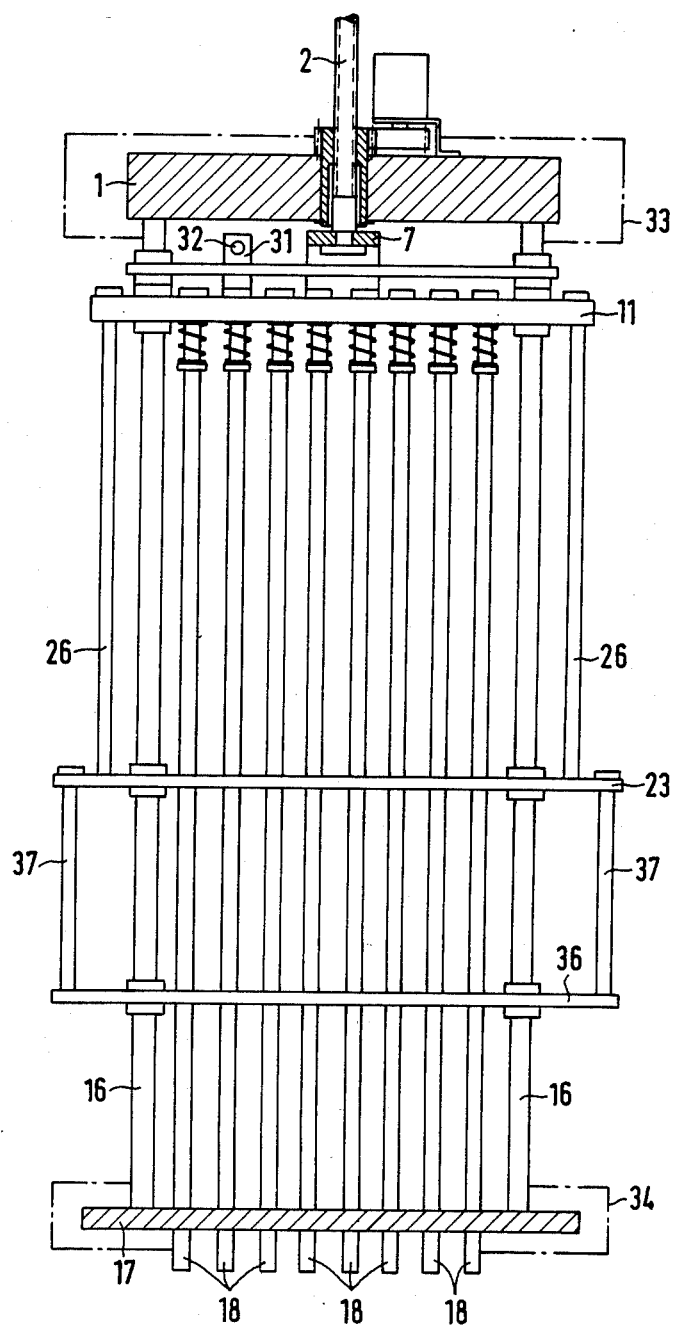
FIG. 5 is a vertical or longitudinal cross-section view taken along line V—V in FIG. 1.

As illustrated in FIG. 5, an additional mounting plate 36 slidably connected to guide rods 16 and suspended from mounting plate 23 (or mounting plate 24, 25 or 27) may be provided for further protecting push rods 18 from bending upon the application of compressive force by pressure plate 11 or 12, 13 or 14. Should it be necessary, mounting plates can be arranged in a similar manner in further horizontal planes. As an alternative to the arrangement illustrated in FIG. 5, hang rods 26 may take the form of hollow tubes, suspension rods 37 being telescopingly mounted to hang rods 26, so that the suspension rods 37 slide inside hang rods 26 upon a seating of lower mounting plate 36 upon guide plate 17 during a fuel rod removal stroke of the pressure plate.

Figure 6:
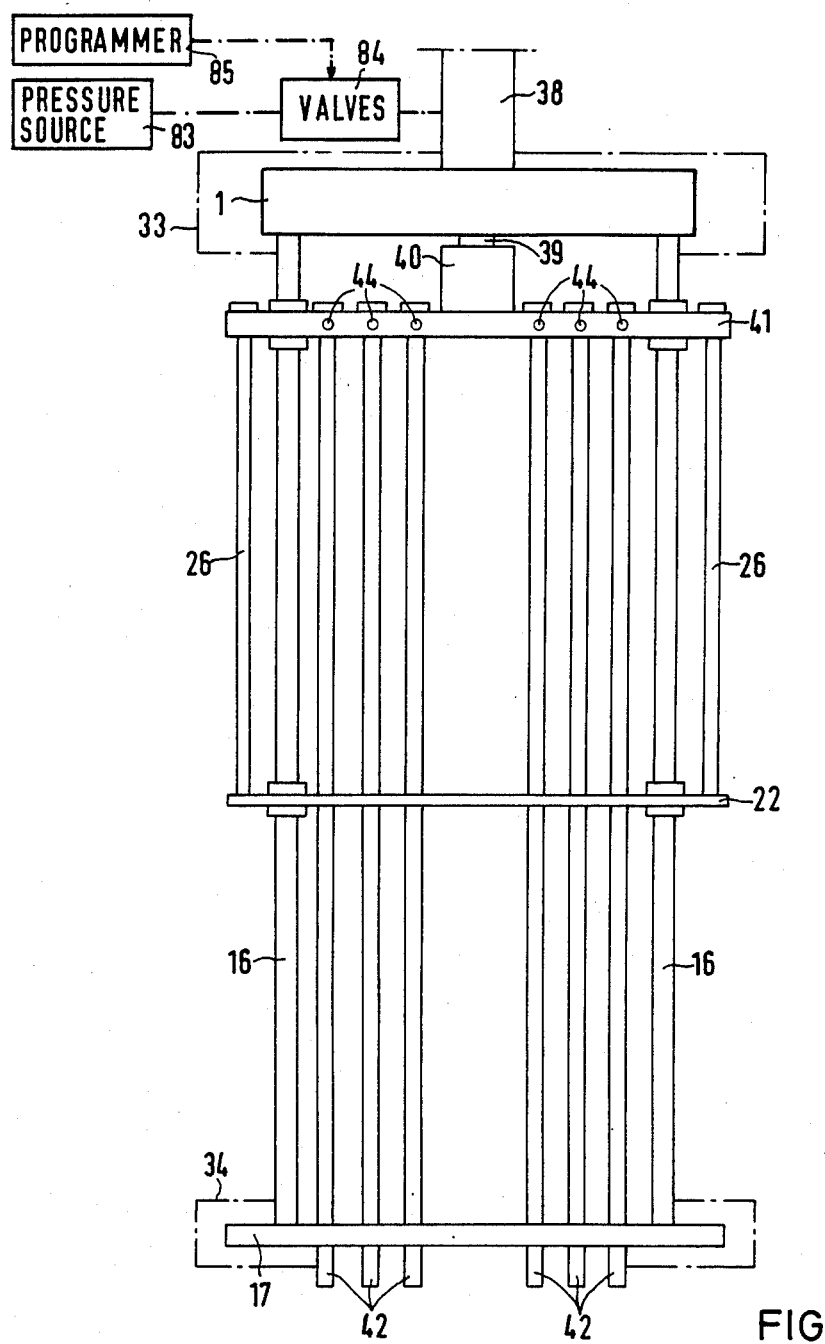
FIG. 6 is a partially schematic front view of another pushing device in accordance with the present invention.
Figure 7:
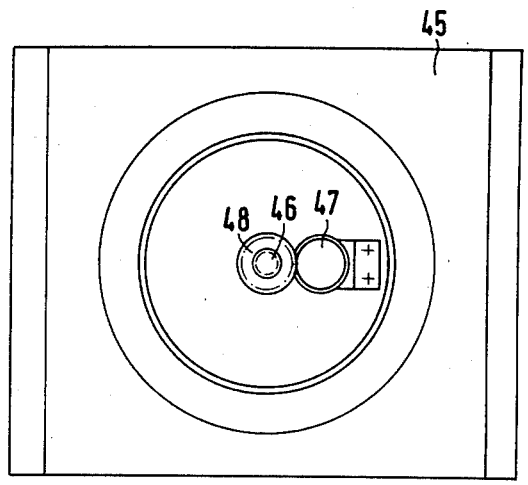
FIG. 7 is a partially schematic top view of yet another pushing device in accordance with the present invention.
Figure 10:
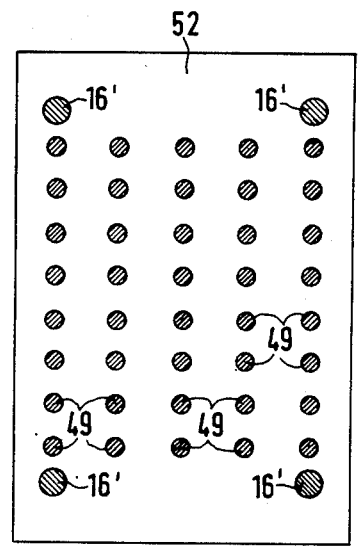
FIG. 10 is a horizontal or transverse cross-section view taken along line X—X in FIG. 9.
Figure 8:
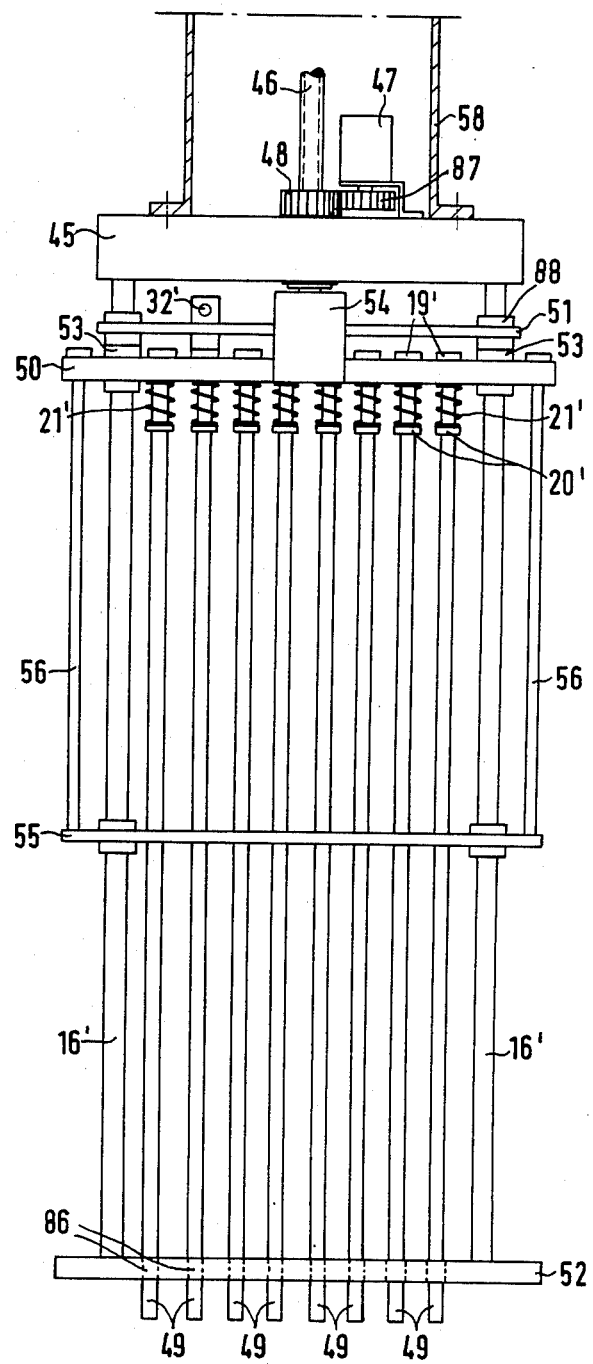
FIG. 8 is a front view, partially in cross-section, of the pushing device of FIG. 7.
Figure 9:
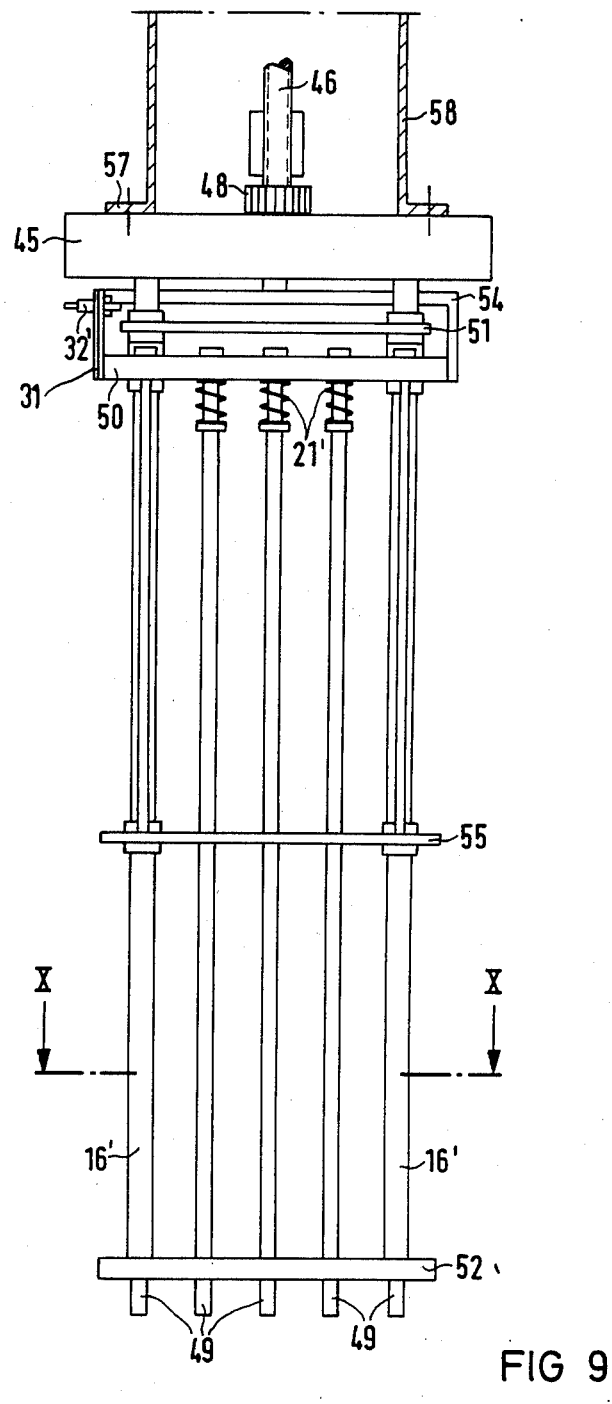
FIG. 9 is a side elevation view, partially in cross-section, of the pushing device of FIGS. 7 and 8.

As illustrated in FIG. 6, the section plan of which figure corresponds to that of FIG. 5, in another nuclear reactor pushing device in accordance with the present invention the drive for a pressure plate or strip 41 comprises a hydraulic cylinder 38 rigidly connected to the pressure plate 41 via a plunger or piston member 39 and a mounting bracket 40. Cylinder 38 communicates with a source of hydraulic pressure 83 via a set of electromagnetic valves 84 operated under the control of a programmer 85 in response to signals arising from the manipulation of nonillustrated switches by a human operator. Push rods 42 are mounted to pressure plate 41 via respective shear pins 44. Pins 44 serve the dual function of transmitting force from pressure plate 41 to push rods 42 and of interrupting the motion of a push rod upon the exceeding of a predetermined threshold pressure by the stress or force transmitted by that push rod. Thus if one of the fuel rods becomes jammed or caught in the spacer of the fuel assembly the shear pin 44 of that push rod is sheared off so that the rod remains in position while the drive itself is not interrupted, plunger 39 and pressure plate 41 bringing the fuel rod ejection stroke of the pushing device to completion and thereby moving the other push rods to their lower end position. Subsequently the stuck fuel rod can be removed with a special pulling tool and treated separately.

In the embodiment illustrated in FIG. 6 there are no push rods located below plunger 39. Such push rods could not be provided with shear pins for preventing the exceeding of predetermined pressure thresholds. If shear pins were provided, plunger 39 would become blocked in the event that one of the shear pins broke. One possible solution to this problem could consist of fastening two central push rods to pressure strip 41 by means of compression springs and extensions of push rods 42, such as compression springs 21 and beads 19 and 20 illustrated in FIG. 2 and by providing a locking assembly comprising a proximity switch such as the microswitches 32 shown in FIG. 2. Alternatively, plunger 39 together with bracket 40 could be offset perpendicularly to the direction of motion of push rods 42. As another possibility, guide rod 16 could take the form of plungers operating in parallel, the plungers being rigidly secured to pressure strip 41 and slidably secured via ball bearing sleeves to base plate 1 and to guide plate 17, the latter to plates being fastened two each other by separate spacer elements.

As illustrated in FIGS. 7 through 10, a pushing device according to the present invention may be provided with a single pressure plate or strip 50 slidably mounted by means of ball bearing sleeves 53 to four guide rods 16' rigid at their upper ends with a base plate 45 and at their lower ends with a guide plate 52. A multiplicity of push rods 49 disposed in a geometric array or pattern corresponding to the raster geometry of the fuel rod assembly are fastened at their upper ends to pressure plate 50 by means of beads or push rod extensions 19' and 20' and compression springs 21', as heretofore described with respect to FIG. 2. At their lower ends, in a neutral or waiting state of the pushing device, push rods 49 traverse guide plate 52 via respective bores 86 having substantially the same shape and cross-sectional area as push rods 49. Bores 86 are disposed in the same array or pattern as push rods 49 which array corresponds to the raster geometry of the fuel rods in the fuel assembly. Push rods 49 and pressure plate 50 are moved by means of a single spindle drive comprising an externally threaded spindle 46, an internally threaded and externally tooth gear nut 48 and an electric motor 47. Motor 47 is provided with a spur gear or pinion whose teeth mesh with the external teeth of gear nut 48. Nut 48 rests on the upper surface of base plate 45 and the internal threads of nut 48 operatively mesh with the external thread of spindle 46. Spindle 46 traverses base plate 45 and is connected to pressure plate 50 via a bracket 54. A switching or actuator control plate 51 is slidably mounted to guide rods 16' by means of ball bearing sleeves 88. Switching control plate 51 generally rests on top of pressure plate 50. However, if during the descent of pressure plate 50 and push rods 49, the motion of one of the push rods is arested owing to a jammed fuel rod in the fuel assembly, the upper bead 19' of the stalled push rod connects switching plate 51, causing the same to actuate proximity switch 32' mounted to pressure plate 50 via a bracket or arm 31'. As heretofore described with respect to the embodiment of FIGS. 1 through 4, proximity switch 32' is operatively connected to electric motor 47 for disengaging or interrupting the operation of the motor upon an actuation of the switch by switching control plate 51.

To prevent push rods 49 from bending, a mounting plate 55 is suspended from pressure plate 50 via a pair of hang or suspension rods 56 rigidly affixed to mounting plate 55 and slidably mounted to pressure plate 50. The pushing device of FIGS. 7 through 10 is supported by a tubular mounting component 58 instead of a coordinate transport system. Tubular mounting 58 is different in design and operation from the transport system 33 and 34 illustrated in FIG. 2. This advantage is especially relevant if the fuel rods can be pushed out in groups so that the position device relative to the fuel assembly does not have to be changed as frequently as, for example, if the fuel rods are pushed out in rows. The pushing device can be suspended via the tubular mounting 58 from a lifting device customarily provided above the reactor pressure vessel and can be transported by means of the tubular mounting into the desired position juxtaposed to the fuel assembly.

Figure 11:
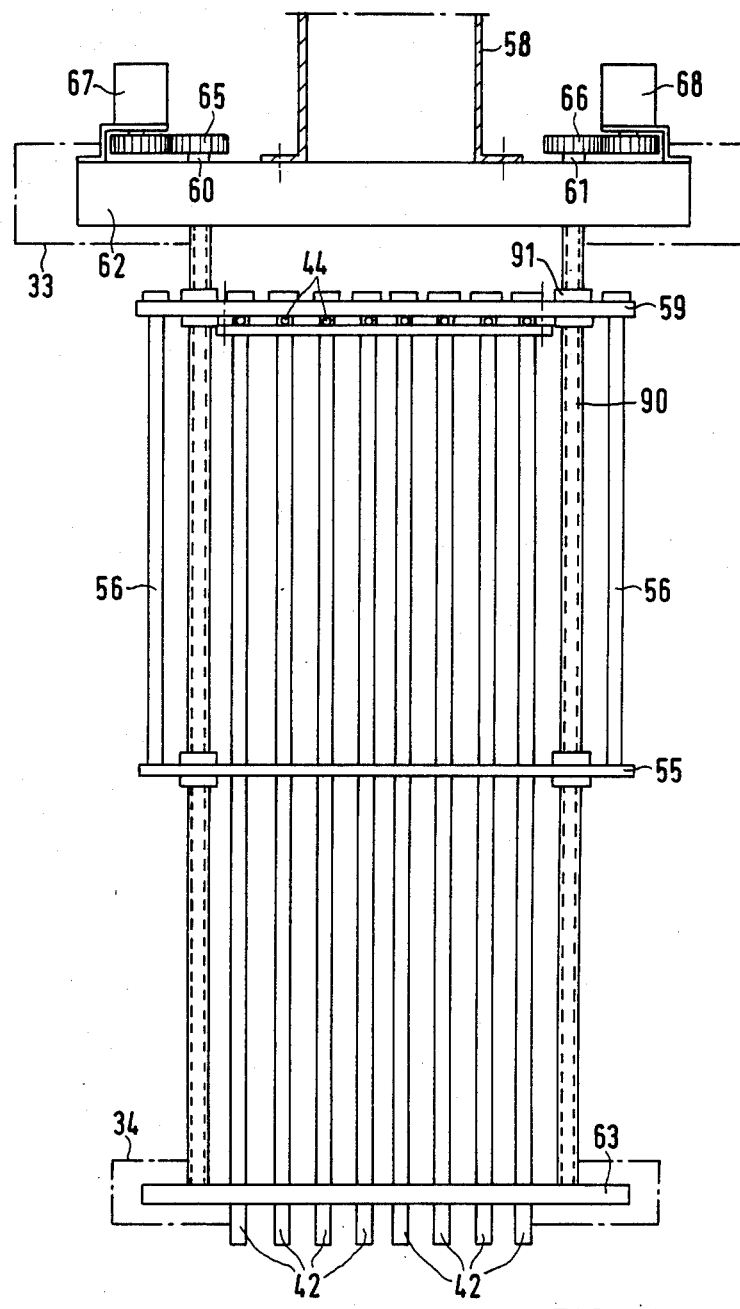
FIG. 11 is a partially schematic front view of yet another pushing device according to the present invention.
Figure 12:
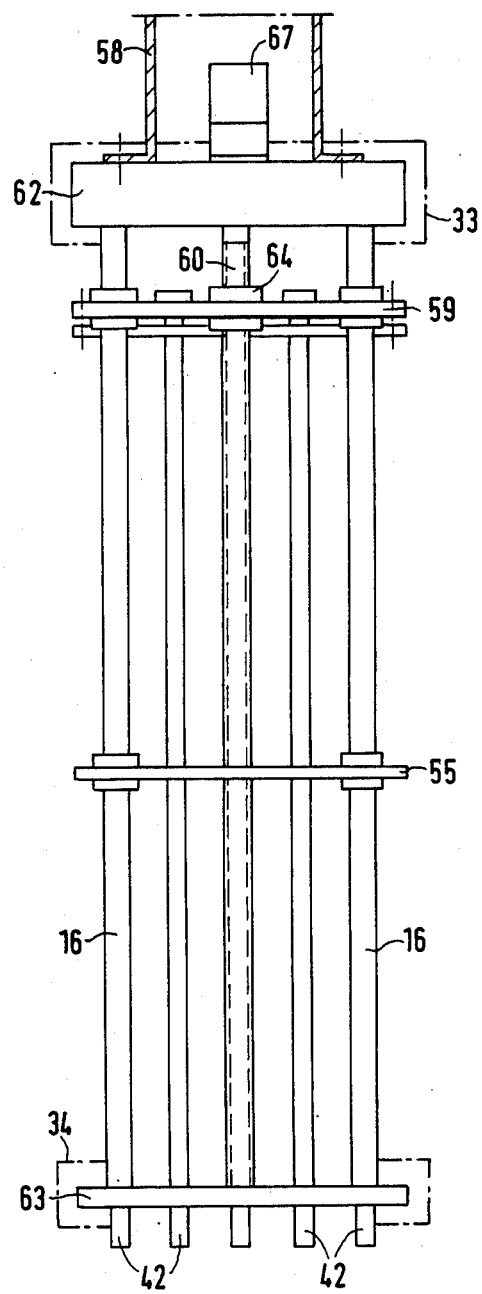
FIG. 12 is a side elevation view of the pushing device of FIG. 11.

A particularly advantageous utilization of space is obtained in a pushing device according to the present invention, as illustrated in FIGS. 11 and 12. A pair of externally threaded spindles 60 and 61 for vertically displacing a pressure plate 59 are rotatably supported at opposite ends in a base plate 69 and a guide plate 63, the external thread 90 of each spindle 60 and 61 meshing with the internal thread of a corresponding nut 91 rigidly secured to pressure plate 59. Each spindle 60 and 61 is provided at its upper end with a friction disc 65 and 66 which is rotatable by means of a respective drive motor 67 and 68 or by a single drive motor via appropriate transmission means. In the pushing device of FIGS. 11 and 12 the threaded spindles are not subjected to vertical motion. Only the pressure plate 59, together with push rods 42 executes the desired vertical lifting motion. Thus the required overall height of the pushing device is reduced to about one half of that in the above-described pushing devices. Push rods 42 are mounted to pressure plate 59 via respective shear pins 44, as heretofore described with respect to FIG. 6. Other elements of the pushing device of FIGS. 11 and 12 operate in substantially the same way and have substantially the same structure as correspondingly designated or referenced elements in FIGS. 1 through 10.

What is claimed is:

1. In a nuclear reactor installation having a fuel assembly with spacers holding a multiplicity of nuclear fuel rods disposed parallel to one another in a geometric array, a pushing device for simultaneously sliding from the spacers a plurality of fuel rods disposed in a pattern, said pushing device comprising:
   a plurality of axially movable push rods equal in number to the plurality of fuel rods to be simultaneously removed from the spacers, said push rods being disposed parallel to each other in the pattern in which said plurality of fuel rods is arranged;
   first mounting means including a pressure plate secured to said push rods at one end thereof for supporting said push rods and further including a guide plate disposed at an opposite end of said push rods in a disengaged state of the pushing device for guiding said push rods during operating of said pushing device, said guide plate having a plurality of bores at least equal in number to said push rods and with substantially the same cross sectional area and shape as said push rods, said bores being disposed in the same pattern as said push rods, said push rods traversing said bores;
   second mounting means, including a base plate on a side of said pressure plate opposite said guide plate and guide rods secured to said base plate and said guide plate, for slidably securing said pressure plate for motion in a direction parallel to said push rods;
   third mounting means connected to said base plate and said guide plate for supporting same in an operating position juxtaposed to the fuel assembly;
   drive means operatively connected to said base plate and said pressure plate for moving said pressure plate relative to said base plate, thereby sliding said plurality of fuel rods from said spacers by means of said plurality of push rods; and
   locking means connected to said push rods for preventing motion of at least any one push rod upon the exceeding of a threshold pressure by the force transmitted by said one push rod.

2. The pushing device defined in claim 1, wherein said first mounting means includes a mounting plate slidably attached to said guide rods between said pressure plate and said guide plate, said mounting plate having a plurality of bores at least equal in number to said push rods and with substantially the same cross sectional area and shape as said push rods, the bores in said mounting plate being disposed in substantially the same pattern as said push rods, said push rods traversing the bores of said mounting plate.

3. The pushing device defined in claim 2 wherein said drive means includes at least one threaded spindle traversing said base plate and connected to said pressure plate, a threaded nut engaging said spindle and supported on said base plate, and a rotary power source operatively connected to said nut.

4. The pushing device defined in claim 3 wherein said locking means includes a switch operatively connected to said drive means for disengaging said drive means upon the exceeding of said threshold pressure by the force transmitted by said one push rod, said first mounting means including spring means engaging said pressure plate and said push rods in part for transmitting compressive force from said pressure plate to said push rods and in part for determining said threshold pressure.

5. The pushing device defined in claim 4 wherein said third mounting means includes transport means for alternately shifting said push rods, said first mounting means and said second mounting means into and out of said operating position.

6. The pushing device defined in claim 4 wherein said third mounting means includes a tubular mounting fastened to said base plate at a substantially central location thereon.

7. The pushing device defined in claim 3 wherein each push rod is rigidly connected to said pressure plate by means of a shear pin, said shear pin forming a component of said first mounting means and of said locking means.

8. The pushing device defined in claim 7 wherein said third mounting means includes transport means for alternately shifting said push rods, said first mounting means and said second mounting means into and out of said operating position.

9. The pushing device defined in claim 7 wherein said third mounting means includes a tubular mounting fastened to said base plate at a substantially central location thereon.

10. The pushing device defined in claim 2 wherein said drive means includes a spindle rotatably mounted to said base plate and said guide plate and extending substantially parallel to said push rods, said pressure plate being provided with a threaded bore traversed by said spindle, said spindle having an external thread operatively engaging said threaded bore.

11. The pushing device defined in claim 10 wherein said locking means includes a switch operatively connected to said drive means for disengaging said drive means upon the exceeding of said threshold pressure by the force transmitted by said one push rod, said first mounting means including spring means engaging said pressure plate and said push rods in part for transmitting compressive force from said pressure plate to said push rods and in part for determining said threshold pressure.

12. The pushing device defined in claim 11 wherein said third mounting means includes transport means for alternately shifting said push rods, said first mounting means and said second mounting means into and out of said operating position.

13. The pushing device defined in claim 11 wherein said third mounting means includes a tubular mounting fastened to said base plate at a substantially central location thereon.

14. The pushing device defined in claim 10 wherein each push rod is rigidly connected to said pressure plate by means of a shear pin, said shear pin forming a component of said first mounting means and of said locking means.

15. The pushing device defined in claim 1 wherein said drive means includes at least one threaded spindle traversing said base plate and connected to said pressure plate, a threaded nut engaging said spindle and supported on said base plate, and a rotary power source operatively connected to said nut.

16. The pushing device defined in claim 1 wherein said locking means includes a switch operatively connected to said drive means for disengaging said drive means upon the exceeding of said threshold pressure by the force transmitted by said one push rod, said first mounting means including spring means engaging said pressure plate and said push rods in part for transmitting compressive force from said pressure plate to said push rods and in part for determining said threshold pressure.

17. The pushing device defined in claim 1 wherein said third mounting means includes transport means for alternately shifting said push rods, said first mounting means and said second mounting means into and out of said operating position.

18. The pushing device defined in claim 1 wherein each push rod is rigidly connected to said pressure plate by means of a shear pin, said shear pin forming a component of said first mounting means and of said locking means.

19. The pushing device defined in claim 1 wherein said drive means includes a spindle rotatably mounted to said base plate and said guide plate and extending substantially parallel to said push rods, said pressure plate being provided with a threaded bore traversed by said spindle, said spindle having an external thread operatively engaging said threaded bore.

* * * * *